United States Patent [19]

McCusker et al.

[11] 4,258,334

[45] Mar. 24, 1981

[54] NOBLE GAS-HALOGEN TRANSFER LASER METHOD AND MEANS

[75] Inventors: Michael V. McCusker, Los Altos; Donald C. Lorents; Robert M. Hill, both of Palo Alto; Davis L. Huestis, Menlo Park, all of Calif.

[73] Assignee: SRI International, Menlo Park, Calif.

[21] Appl. No.: 686,698

[22] Filed: May 17, 1976

[51] Int. Cl.³ .............................................. H01S 3/223
[52] U.S. Cl. ............................................... 331/94.5 G
[58] Field of Search .................... 331/94.5 G, 94.5 PE

[56] References Cited

U.S. PATENT DOCUMENTS

| | | | |
|---|---|---|---|
| 3,882,414 | 5/1975 | Jeffers et al. | 331/94.5 G |
| 3,960,422 | 6/1976 | Shull | 331/94.5 G |

OTHER PUBLICATIONS

McCusker et al., *Applied Physics Letters*, vol. 27, No. 6, Sep. 15, 1975, pp. 363–365.
Cher et al., *Applied Physics Letters*, vol. 28, No. 4, Feb. 15, 1976, pp. 219–221.
Bhaumik et al., *Laser Focus*, Feb. 1976, pp. 54–55.
Gutcheck et al., *Journal of Applied Physics*, vol. 46, No. 7, Jul. 1975, pp. 3106–3108.
Shay et al., *Applied Physics Letters*, vol. 26, No. 9, May 1, 1975, pp. 531–534.
Golde et al., *Chemical Physics Letters*, vol. 29, No. 4, Dec. 1, 1974, pp. 486–490.
Broyer et al., *Canadian Journal of Physics*, vol. 51, 1973, pp. 226–228.
Ewing et al., *Physical Review*, vol. 12, No. 1, Jul. 1975, pp. 129–132.
Velazco et al., *The Journal of Chemical Physics*, vol. 62, No. 5, Mar. 1975, pp. 1990–1991.

*Primary Examiner*—William L. Sikes
*Attorney, Agent, or Firm*—Victor R. Beckman

[57] ABSTRACT

Halogen transfer laser method and means are disclosed employing a dilute mixture of molecular halogen vapor in high pressure noble gas. Noble gas atoms and molecules are excited by use of electrons to high energy metastable and/or excimer states. Collisional and/or radiative transfer of electronic excitation from the excited noble gas atoms and molecules to the lasing halogen molecules takes place for excitation of halogen molecules to upper ionic states in sufficient number to establish a population inversion in the electronic energy levels thereof for lasing. In addition to halogens, halogen-bearing compounds which dissociate and appropriately recombine to provide diatomic halogen for lasing also may be used. The laser is tunable over an electromagnetic energy range which includes ultraviolet radiation. Operation at high peak power levels with high efficiency is possible.

21 Claims, 3 Drawing Figures

NOBLE GAS-HALOGEN TRANSFER LASER METHOD AND MEANS

BACKGROUND OF INVENTION

Although numerous gas lasers are known, they generally suffer from such deficiencies as limited tunability, inability to operate at short wavelengths including the near ultraviolet range, low efficiency and inability to operate at high power outputs.

SUMMARY OF INVENTION AND OBJECTS

An object of the present invention is the provision of laser operating method and apparatus which overcome the above and other shortcomings and disadvantages of the prior art.

An object of this invention is the provision of an improved gas laser which is operable at frequencies within the ultraviolet spectrum, and which is capable of large as well as small scale implementation.

The above and other objects and advantages are achieved by use of a vapor mixture comprising a noble gas and diatomic halogen within a resonant optical cavity. A dilute mixture of the diatomic halogen vapor or halogen bearing compound in high pressure (e.g. 0.5 to 30 or more atmospheres) noble gas is employed. The dense noble gas is pumped with high efficiency to high electronic atomic and/or molecular states by use of an electron beam source or electron beam initiated-sustainer discharge type exciting means. Because of the low density of diatomic halogen vapor employed, relatively few diatomic halogen molecules are directly excited by the electron beam. By collisional and/or radiative transfer of excitation from the excited noble gas molecules and atoms to the diatomic halogen vapor, the halogen molecules are excited to specific excited ionic states. Transfer of excitation to the halogen molecular vapor is selective in the sense that radiation is observed from a limited number of excited states. The high pressure noble gas contributes to this selectivity by enhancing relaxation processes in the excited diatomic halogen molecule prior to lasing; which relaxation leads to population of the lowest vibrational states of the upper (ionic) lasing level. The diatomic halogen may be provided by any suitable source thereof including, for example, a suitable halogen-bearing compound which dissociates upon exposure to the e-beam source of excitation. Emission of a beam of radiation from the optical cavity is stimulated from the population inverted halogen molecules upon transition of the molecules from the upper ionic states to the lower bound states.

DETAILED DESCRIPTION

Figure 1:
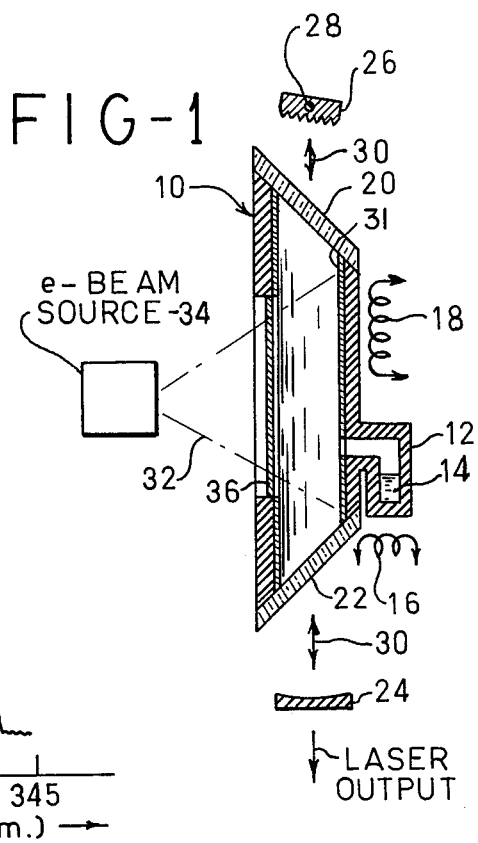
FIG. 1 is a longitudinal sectional view, in semidiagrammatic form, of a laser embodying this invention.

Reference first is made to FIG. 1 wherein, a noble gas-diatomic halogen transfer laser is shown comprising an enclosure or reaction vessel 10 for containing a mixture of noble gas and diatomic halogen vapor. A reservoir 12 in communication with the tube or vessel may be provided outside the same for solid or liquid diatomic halogen or halogen-bearing compound 14, and heat exchangers 16 and 18 adjacent the reservoir and reaction vessel may be used to vaporize, or condense, such solid or liquid within the reservoir and to establish the halogen vapor pressure within the vessel by control of the reaction vessel temperature. For simplicity, the heat exchangers are illustrated schematically as heat exchange elements adapted for connection to suitable coolant or heat sources, not shown, as required. Also, mixing means such as a rotating vane, or the like, not shown, may be included within the reaction vessel to promote rapid mixing of the halogen vapor with noble gas. Alternatively, gas flow from a premixed reservoir may be used. The illustrated arrangement, and alternative arrangements not shown are well known in the art and require no detailed description. The system employed depends, inter alia, upon the state of the halogen or halogen-bearing compound at ambient temperature.

Opposite ends of the enclosure 10 are sealed by suitable type Brewster angle windows 20 and 22 which are substantially transparent to radiation at the laser operating frequencies. The enclosure is located within a resonant optical cavity comprising a partially reflecting mirror 24 at the lower end and a tuning and reflecting means 26 at the upper end. The tuning and reflecting means 26 simply may comprise a diffraction grating which is rotatable about an axis 28 extending normal to the plane of the drawing for wavelength selective reflection of the laser beam 30. Reflecting means, such as a fixed mirror may be employed in place of the rotatable diffraction grating for fixed frequency operation. Laser vessels, resonant optical cavities, and other such laser components are well known and require no detailed description. To avoid rapid chemical contamination due to the high reactivity of the hot halogen the reaction vessel may be formed of stainless steel, lined, or coated, with graphite 31 or other suitable material, or passivated by known methods. Also, in practice, the reservoir 12 may be separately formed of some inert material, such as "Pyrex" glass, which reservoir is attached to the vessel with suitable inert seals. Again, such lined and heated vessels, and vessels with reservoirs for liquid or solid material to be vaporized are well known and require no detailed description.

In the illustrated arrangement pumping is effected by means of a fast, high energy, electron beam 32 provided by an electron beam (e-beam) source 34. A window 36 comprising, for example, a thin foil, is provided in the wall of the vessel for passage of electrons from the source to the gas mixture. Electrons that penetrate the foil produce a large density of excited noble gas atoms and molecules. The vessel and electron beam source may be located within an evacuated chamber, not shown, and focusing means for directing the e-beam from the source onto the window also may be included. In the illustrated arrangement the velocity, or energy, of the electron beam is selected for optimum production of noble gas ions or excited noble gas atoms. Suitable electron beam energies may be typically 0.2 to 1 MeV or greater. High energy, high current, electron beam sources are well known and require no additional description. Another suitable excitation means which may be employed in the practice of this invention comprises the e-beam initiated-sustainer discharge type wherein ionization and/or excitation of the relatively high pressure noble gas is initiated by use of a high energy electron beam and excitation then is continued by electrical discharge means. In any event, e-beam excitation is employed in the excitation of the noble gas.

The novel laser of this invention is operated with a dilute mixture of halogen gas in a noble gas at a relatively high pressure compared, for example, to prior art lasers which employ buffer gases. For example, a mixture comprising noble gas at a pressure of say, 0.5 to 30 atmospheres or more and diatomic halogen at a vapor pressure of say 0.01 to 10 torr is contemplated. As noted above, the halogen vapor pressure may be controlled by adjustment of the vessel and reservoir temperatures (in the case of $Br_2$ or $I_2$) and/or by standard gas mixing means (in the case of $Cl_2$ and $F_2$) or the like.

Diatomic halogens which may be employed in the practice of this invention include, for example, $F_2$, $Cl_2$, $Br_2$, and $I_2$, and suitable noble gases which may be employed include He, Ne, Ar, Kr, and Xe. As noted above, the diatomic halogen required for operation may be obtained from the halogen initially in the solid, liquid, or gaseous state. Alternatively, the diatomic halogen may be supplied by a suitable halogen-bearing compound which is decomposed by operation of the e-beam source. Suitable compound materials which may be employed include, for example, HI, $CH_3I$, $CF_3I$, HBr, $CH_3Br$, HCl, $CH_3Cl$, and many others. The halogen-bearing compound, in gas form, dissociates by operation of the e-beam source, (or e-beam initiated-sustainer discharge source) and subsequent recombination of two halogen atoms provides the necessary diatomic halogen for laser operation. Obviously, such dissociation is not necessarily a direct result of the electron collisions with the halogen-bearing compound but may involve collisions with the excited noble gas.

Figure 2:
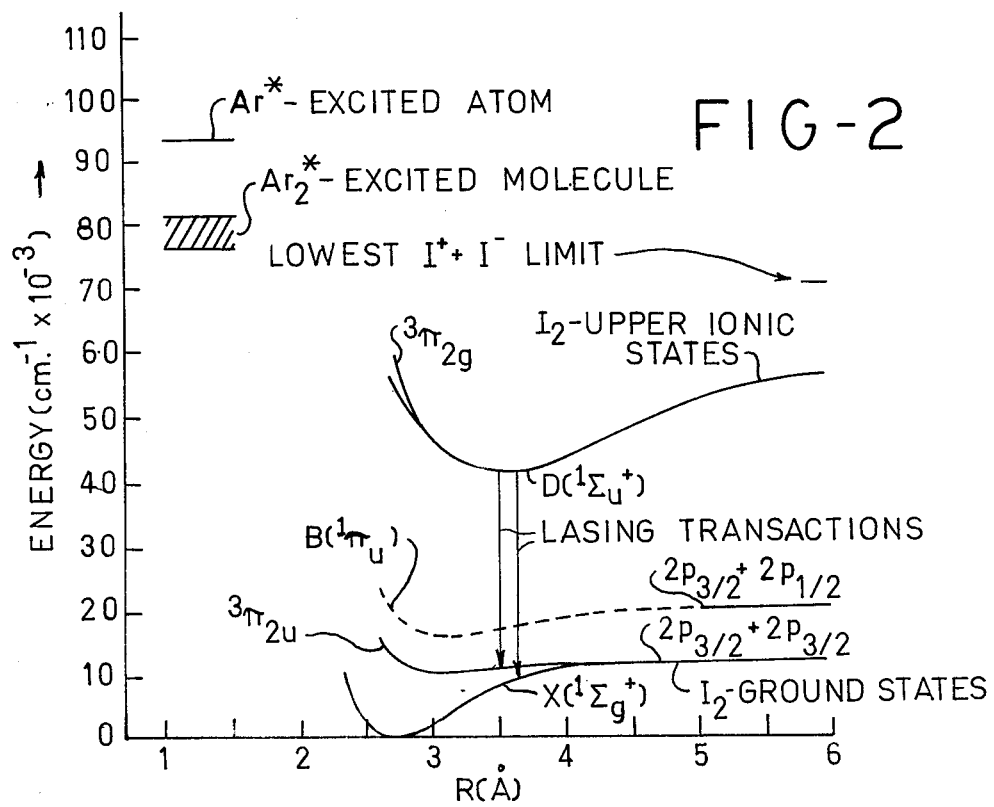
FIG. 2 shows relevant energy curves of molecular iodine as deduced from spectroscopic data, together with levels of available energy from excited argon molecules and atoms.

For purposes of description only, and not by way of limitation, argon-iodine transfer laser method and means embodying this invention now will be described. A high current density fast electron beam from the source 34 incident upon the high pressure argon gas produces high energy states, below the ionization continuum. Reference is made to the energy diagram of FIG. 2 wherein energy levels for electronic excitation of argon atoms and molecules are shown. It will be seen that the excitation level for argon atoms exceeds that for argon molecules. However, at relatively low argon gas pressure (e.g., say, 0.5 to 5 atmospheres) molecular excimer formation from the excited argon gas is small. As the argon gas pressure increases the formation of such excimer states increases. Pumping to either and/or both argon atom and argon molecule excited states may be employed in the operation of the laser since the energy match for energy transfer from the argon to the iodine molecules is good for either argon excited condition. From FIG. 2 it will be noted that pumping of the argon to levels above the lowest ionization level for iodine is provided. However, due to the low density of iodine vapor in the mixture little direct energization of iodine by the electron beam is effected.

Excitation transfer from the excited atomic and or molecular argon gas to the iodine vapor takes place through collisional and/or radiative means. Most such energy transfer is from excited argon to the upper ionic states of the iodine molecule. Collisionally induced electronic, vibrational, and rotational relaxation occurs among the upper ionic states prior to radiation from the lower ionic states for efficient creation of the population inversion required for lasing. As seen from the energy diagram of FIG. 2, the low ionization level of atomic iodine lies between the excited argon states and the upper ionic states of molecular iodine.

Lasing occurs on transitions from the upper ionic levels of iodine molecules to the lower electronic states thereof, from which there is rapid vibrational relaxation to the lowest vibrational levels of that state. Subsequent relaxation to other vibrational modes of the ground electronic state follows. For simplicity, potential curves of only two upper ionic states and two lower states for the molecular iodine are shown. It will be understood that a large number of other energy curves, not shown, exist, and that the lasing action is not limited to operation between the illustrated energy levels. The above-mentioned relaxation of the ground electronic states is sufficiently rapid to allow for lasing transitions and, such relaxation occurs by collisions with the inert argon gas, and with the halogen-bearing compounds.

Figure 3:
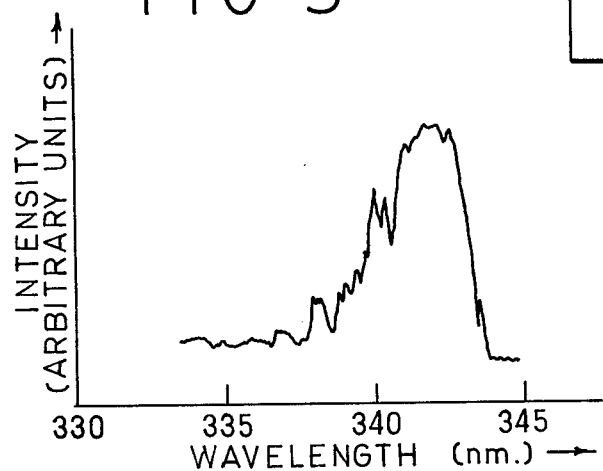
FIG. 3 is an observed fluorescence emission spectrum of the illustrated argon-iodine gas laser shown in FIG. 1.

Reference now is made to FIG. 3 wherein an emission spectrum of the above-described laser employing electron-beam excitation of an argon-iodine mixture is shown. Tuning over a range of from approximately 330 to 344 nm. is possible. The system lends itself to scaling to high peak power levels, and operates with high efficiency. In addition to the argon-iodine combination, other combinations of the above-identified materials which have been studied and can be made to lase in the above-described manner include helium-chlorine, helium-bromine, helium-iodine, argon-chloride, argon-bromine, and krypton-iodine. Chlorine molecules will lase over a wavelength range between approximately 240 nm. and 255 nm. Bromine molecules will lase over a range between approximately 290 nm. and 294 nm. Some combinations are not within the scope of this invention, including argon-fluorine, krypton-fluorine, krypton-chlorine, xenon-fluorine, and xenon-chlorine. With such combinations, mixed halogen/noble gas molecules are formed, as distinguished from diatomic halogens, (i.e. ArF, KrF, KrCl, XeF and XeCl) which do not lase in the manner of this invention, but which can be made to lase by other schemes. In view of the present teachings, routine experimentation will reveal not only optimum systems including relative amounts and pressures of gases employed, but also other combinations of gases which lase in the manner of this invention. For example, routine experimentation using the noble gas neon with certain of the diatomic halogens will readily reveal the feasibility of such combinations.

The invention having been described in detail in accordance with the requirements of the Patent Statutes, various changes and modifications will suggest themselves to those skilled in this art. For example, operation in either the pulsed or continuous mode is contemplated. Also, a gas flow system may be employed rather than the illustrated confined gas arrangement. In addition, the use of buffer and/or relaxant gases in accordance with prior art teachings is contemplated where desirable. It is intended that the above and other such changes and modifications shall fall within the scope and spirit of the invention as defined in the appended claims.

We claim:

1. A laser capable of producing stimulated laser emission comprising,
    an optical resonant cavity containing a gas mixture comprising noble gas atoms and diatomic halogen gas molecules, exciting means including an electron beam source for electronic excitation of the noble gas atoms to excite the same which excited noble gas, in turn, excite diatomic halogen gas molecules from which stimulated laser emission is produced.

2. The laser as defined in claim 1 wherein the partial pressure of the noble gas within the cavity is between about 0.5 to 30 atmospheres, and the partial pressure of the diatomic halogen gas is between about 0.01 to 10 torr.

3. The laser as defined in claim 1 wherein said cavity includes a reservoir for solid and liquid halogen, and
means for controlling the temperature of the reservoir to control vaporization of the halogen.

4. The laser as defined in claim 3 including means for controlling the temperature of said enclosure for control of the vapor pressure of said diatomic halogen gas.

5. The laser as defined in claim 1 wherein the exciting means for electronic excitation of the noble gas atoms comprises an electron beam initiated-sustainer discharge type excitation means.

6. The laser as defined in claim 1 including,
a halogen-bearing compound within the cavity supplied by excitation from said exciting means to provide said diatomic halogen gas molecules.

7. The laser as defined in claim 1 wherein noble gas atoms are excited to an excimer formation by said means for electronic excitation thereof.

8. In a gas laser for producing stimulated laser emission,
a tuned optical resonant laser cavity comprising a gas mixture which includes a laser gas comprising diatomic halogen molecules and a noble gas comprising noble gas atoms, and
means including a beam of electrons impinging upon the gas mixture for supplying excitation energy to said gas mixture to form metastable atoms of said noble gas for exciting diatomic halogen gas molecules to upper ionic states by collisional and radiative transfer of energy from said metastable atoms of noble gas from which stimulated laser emission is produced.

9. In a gas laser as defined in claim 8 wherein said noble gas is at a partial pressure of at least 0.5 atmospheres.

10. The method of producing optical laser energy in a resonant optical cavity which contains a gas mixture comprising noble gas atoms and molecules of diatomic halogen gas,
establishing the diatomic gas partial pressure of at least 0.01 torr,
establishing the noble gas partial pressure of at least 0.5 atmospheres, and
exciting by electron beam means noble gas atoms for transfer of electronic excitation from the excited noble gas to diatomic halogen gas molecules to excite diatomic halogen gas molecules to the upper ionic states in sufficient number to establish a population inversion in the electronic energy levels of the molecular diatomic halogen gas.

11. The method of producing optical laser energy as defined in claim 10 including,
tuning the resonant optical cavity to produce stimulated emission having a wavelength appropriate to the halogen molecule employed.

12. The method of producing optical laser energy as defined in claim 11 wherein the halogen molecule employed comprises iodine, and the resonant optical cavity is tuned to produce stimulated emission having a wavelength between about 330 and 343 nanometers.

13. The method of producing optical laser energy as defined in claim 11 wherein the halogen molecule comprises chlorine, and the resonant optical cavity is tuned to produce stimulated emission having a wavelength between about 240 and 250 nanometers.

14. The method of producing optical laser energy as defined in claim 11 wherein the halogen molecule comprises bromine, and the resonant optical cavity is tuned to produce stimulated emission having a wavelength between about 290 and 294 nanometers.

15. The method of producing optical laser energy as defined in claim 10 wherein noble gas atoms are excited to a metastable state.

16. The method of producing optical laser energy as defined in claim 10 wherein stimulated emission is produced by lasing transition of diatomic halogen gas molecules from said excited upper ionic state to a high vibrational level of a lower state of said diatomic halogen gas molecules.

17. The method of producing optical laser energy as defined in claim 16 wherein gas molecules in the lower laser state return to low level ground states by collisional relaxation.

18. The method of producing optical laser energy as defined in claim 10 wherein said noble gas atoms are excited to an excimer state from which collisional and radiative transfer to diatomic halogen gas molecules is effected.

19. The method of producing optical laser energy as defined in claim 10 wherein said resonant optical cavity contains a halogen-bearing compound, and including
exciting said halogen-bearing compound for production of said diatomic halogen gas.

20. A gas laser comprising,
an optical resonant cavity containing a mixture of gases comprising noble gas atoms and diatomic halogen molecules, the partial pressure of said noble gas lying in the range of 0.5 to 30 atmospheres and the partial pressure of said diatomic halogen molecular gas lying in the range of 0.01 to 10 torr, and
exciting means including an electron beam source for exciting said noble gas so that energy is transferred from the noble gas to the molecules of diatomic halogen gas for emission of radiation.

21. The gas laser as defined in claim 20 wherein said mixture of gases includes a halogen-bearing compound which is excited by said exciting means for production of said diatomic halogen molecules.

* * * * *